United States Patent [19]

Alexander

[11] Patent Number: 5,096,359

[45] Date of Patent: Mar. 17, 1992

[54] VEHICLE RESTRAINT ACTUATOR

[75] Inventor: James C. Alexander, London, Canada

[73] Assignee: The Serco Corporation, Ontario, Canada

[21] Appl. No.: 540,739

[22] Filed: Jun. 20, 1990

[51] Int. Cl.$^5$ .............................................. B65G 69/00
[52] U.S. Cl. ...................................... 414/401; 414/584; 14/71.5
[58] Field of Search ................ 414/396, 401, 584; 14/71.1, 71.3, 71.5

[56] References Cited

U.S. PATENT DOCUMENTS

| | | | |
|---|---|---|---|
| 4,282,621 | 8/1981 | Anthony et al. | 414/584 X |
| 4,379,354 | 4/1983 | Hahn et al. | 414/401 X |
| 4,488,325 | 12/1984 | Bennett et al. | 414/401 X |
| 4,553,895 | 11/1985 | Ellis | 414/401 |
| 4,555,211 | 11/1985 | Metz | 414/401 |
| 4,630,989 | 12/1986 | Davey | 14/71.1 X |
| 4,767,254 | 8/1988 | Kovach et al. | 414/401 |
| 4,915,568 | 4/1990 | West | 414/584 X |
| 4,969,792 | 11/1990 | Ellis et al. | 414/401 |

FOREIGN PATENT DOCUMENTS 735535  5/1980  U.S.S.R. ................. 414/584

Primary Examiner—Robert J. Spar
Assistant Examiner—Robert S. Katz
Attorney, Agent, or Firm—Sughrue, Mion, Zinn, Macpeak & Seas

[57] ABSTRACT

Operator intervention in parking a truck and positioning a dock leveler for performing a loading or unloading operation is simplified by a vehicle restraint actuator which is responsive to movement of the dock leveler or other vehicle loading mechanism to cause a vehicle restraint to engage an ICC bar of a vehicle. The vehicle restraint is held in place by a latch mechanism, which is released when the vehicle loading mechanism is moved to perform loading or unloading.

6 Claims, 5 Drawing Sheets

VEHICLE RESTRAINT ACTUATOR

BACKGROUND OF THE INVENTION

The present invention relates to an apparatus for automatic actuation of a vehicle restraint. Such vehicle restraints are used, for example, to restrain vehicles which are parked at a loading dock. The inventive actuator is intended for use with a vehicle restraint of the type disclosed in copending, commonly-assigned application No. 07/466,799, filed Jan. 18, 1990. However, the actuator is susceptible of a wide range of use with many types of vehicle restraints.

Vehicle restraints have been used in the material handling industry to prevent a vehicle from moving away from the loading dock as the vehicle is being loaded or unloaded. Such restraints are substitutes for chains and wheel chocks. All such restraints hold vehicles by holding the vehicle's ICC bar, such a bar being a requirement for vehicles which carry heavy loads. Such ICC bars, as required by law, are placed at the rear of a vehicle, within specified height and distance parameters from the ground and from the rear of the vehicle. As the vehicle is loaded and/or unloaded, it tends to "float", that is, move vertically, thereby varying the vertical position of the ICC bar from the ground.

There are a variety of vehicle restraints which have been proposed to restrain vehicles, yet take into account vehicle float. Various categories of these are described in the above-mentioned copending application. The disclosure of that application is incorporated herein by reference.

One of the deficiencies in all of the categories of vehicle restraints discussed in that application is that some action by the operator is required to actuate and release the restraint. Such operator intervention is not always advisable, because in some circumstances, for example, restraint may be activated too early, or released too soon.

There are some vehicle restraints which are activated automatically when the presence of a truck is sensed by a wand or a photo-electric eye. However, both of these approaches require electric controls and a power source to actuate the device. Further, a time delay device is required in the control circuit so that the device does not engage as soon as the truck is detected, but rather allows time to re-orient the truck if it is not parked properly.

Another type of early model vehicle restraint used a mechanical wand which sensed the presence of the truck and thus actuated the vehicle restraint. However, this mechanical approach was unacceptable because it was not possible to impose a time delay. Further, some automatic vehicle restraints are activated through an electrical circuit which senses actuation of a dock leveler. Such an approach would be attractive, because the dock leveler ordinarily will not be actuated until the truck is properly parked. However, this electrical approach requires electric controls and a power source to actuate the restraint.

SUMMARY OF THE INVENTION

In view of the foregoing, it is a primary object of the present invention to provide a vehicle restraint which operates automatically, in response to actuation of a dock leveler but which does not require electrical circuitry, and thus is simple to install and maintain.

To achieve the foregoing and other objects, the inventive vehicle restraint actuator, for use in conjunction with a dock leveler or other vehicle loading device, includes a latch which cooperates with a latch bar on the vehicle restraint to hold the restraint in a stored position. The device further includes a spring biased member, attached to part of the vehicle loading device, and responsive to movement of that device, for releasing the latch and allowing the vehicle restraint to move in position to restrain a vehicle.

The invention is intended for use with a variety of types of vehicle restraints, and with a variety of types of vehicle loaders. The presently preferred embodiment is used with a horizontally-storing pit leveler and the vehicle restraint disclosed in the above-mentioned copending application.

DESCRIPTION OF THE DRAWINGS

The foregoing and other objects and features of the invention will become more apparent when viewed in light of the following detailed description, with reference to the accompanying drawings, in which.

DETAILED DESCRIPTION OF THE PREFERRED EMBODIMENT

Figure 1:
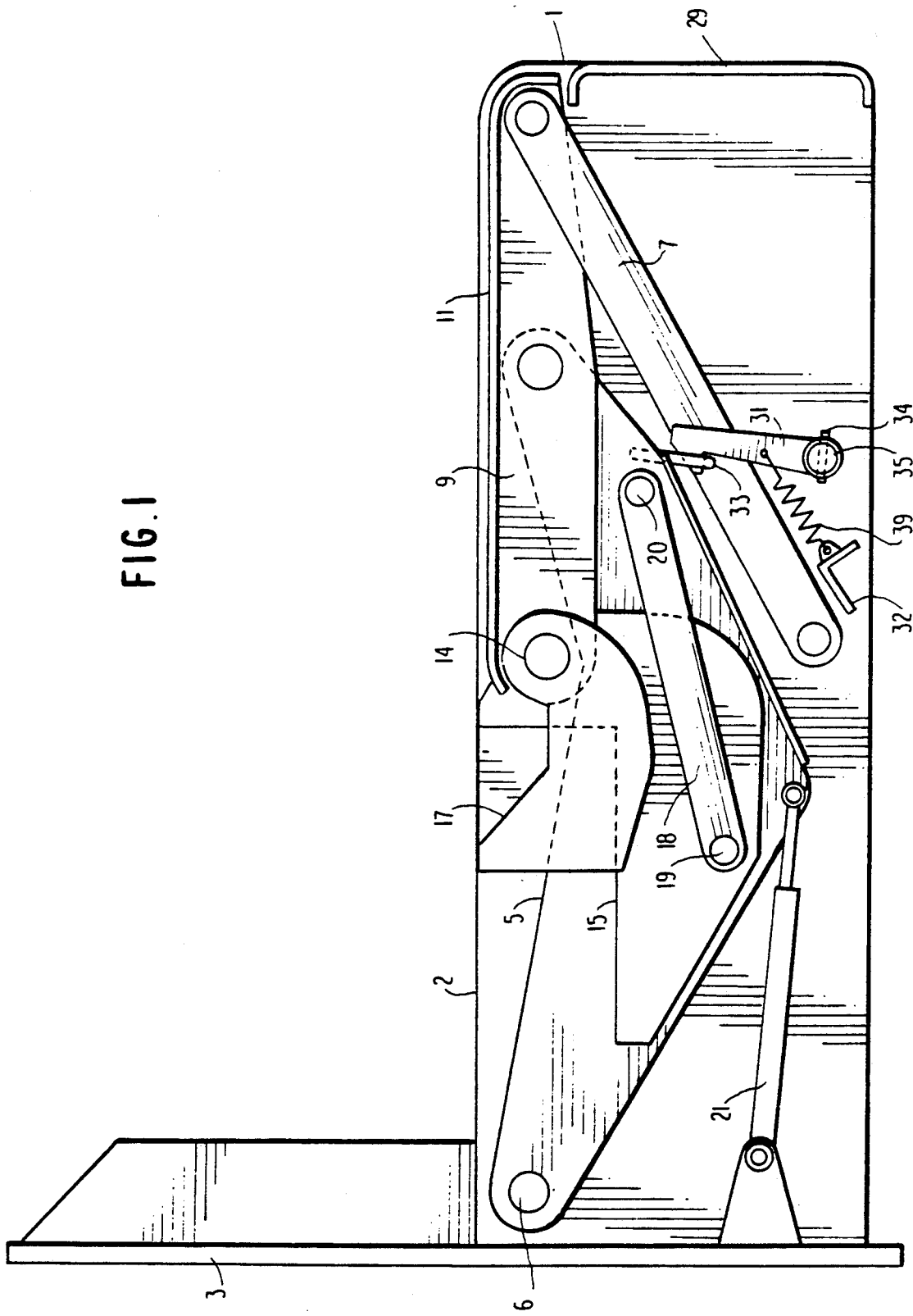
FIG. 1 is a cross-sectional side view of a vehicle restraint, and showing the general technique for implementing the inventive vehicle restraint actuator.

Referring to FIG. 1, the vehicle restraint 17 is held in a stored position by a latch arm assembly 31 which is biased by a spring 39 to engage a latch bar 33 on a main arm assembly 5. Main arm assembly 5 has its movement controlled by gas spring 21. The latch arm assembly 31 is attached by a pin 34 to a shaft 35 which is located by holes in side plates 1 and 2 of the vehicle restraint housing assembly 3. Spring 39 is attached at its other end to an angle member 32 which is coupled to both side plates to provide lateral strength to the frame assembly. FIG. 1 thus shows a cross-section revealing the internal components, including the latch arm assembly 31.

Figure 2:
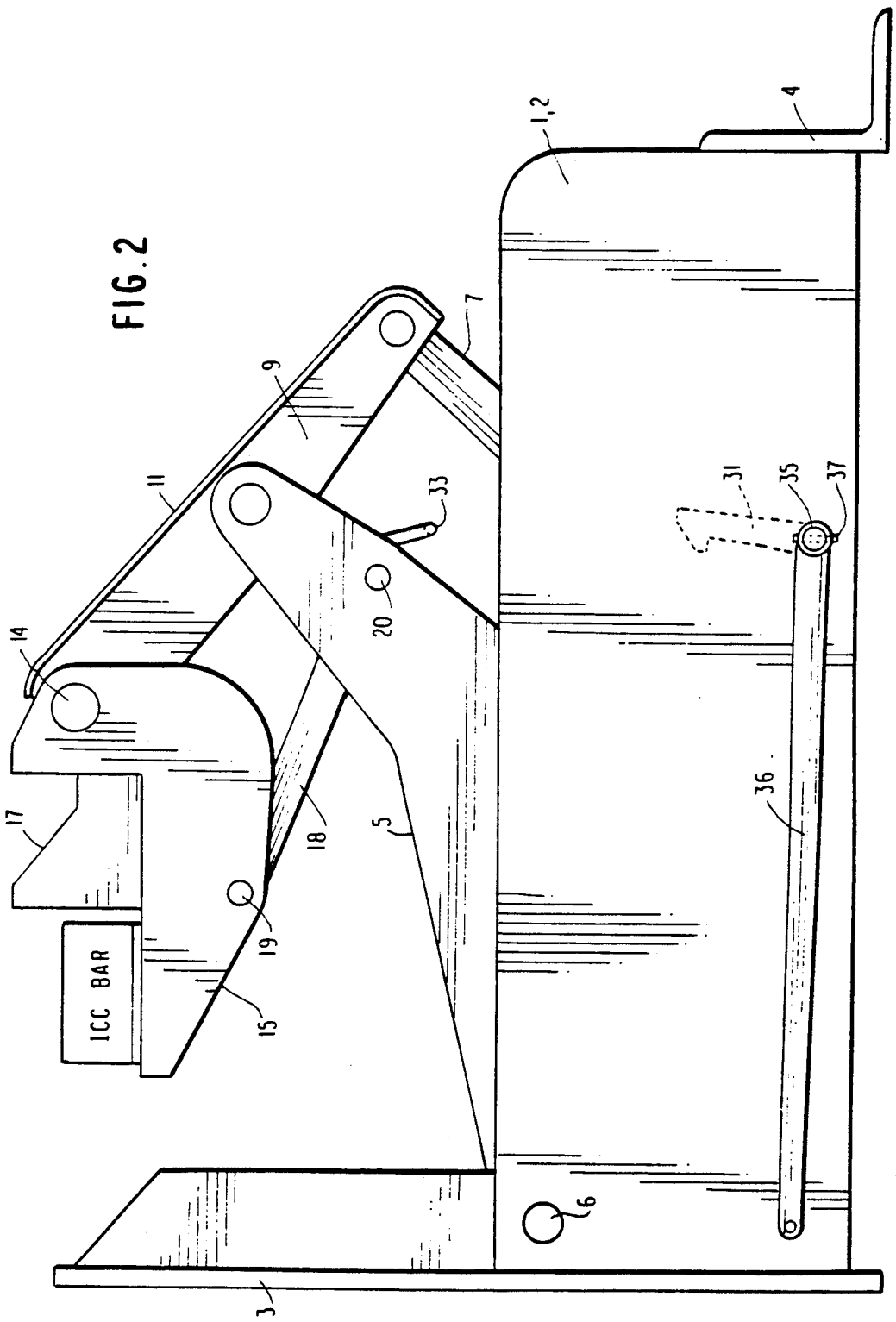
FIG. 2 shows a side view of the vehicle restraint, and associated vehicle restraint actuator structure when the restraint is in an operative position.

FIG. 2 shows another, outside view of the device of FIG. 1, in which a release arm 36 is attached by pin 37 to the shaft 35. The latch arm assembly 31 is shown in dotted outline form. Lifting the end of the release arm will cause the latch arm assembly 31 to disengage the latch bar 33, and thus allow the vehicle restraint to be raised by gas spring 21 (FIG. 1) to engage the truck ICC bar. The gas spring 21 biases and automatically lifts the vehicle restraint from the position shown in FIG. 1 to that shown in FIG. 2, when the latch arm assembly 31 becomes disengaged.

Figure 3:
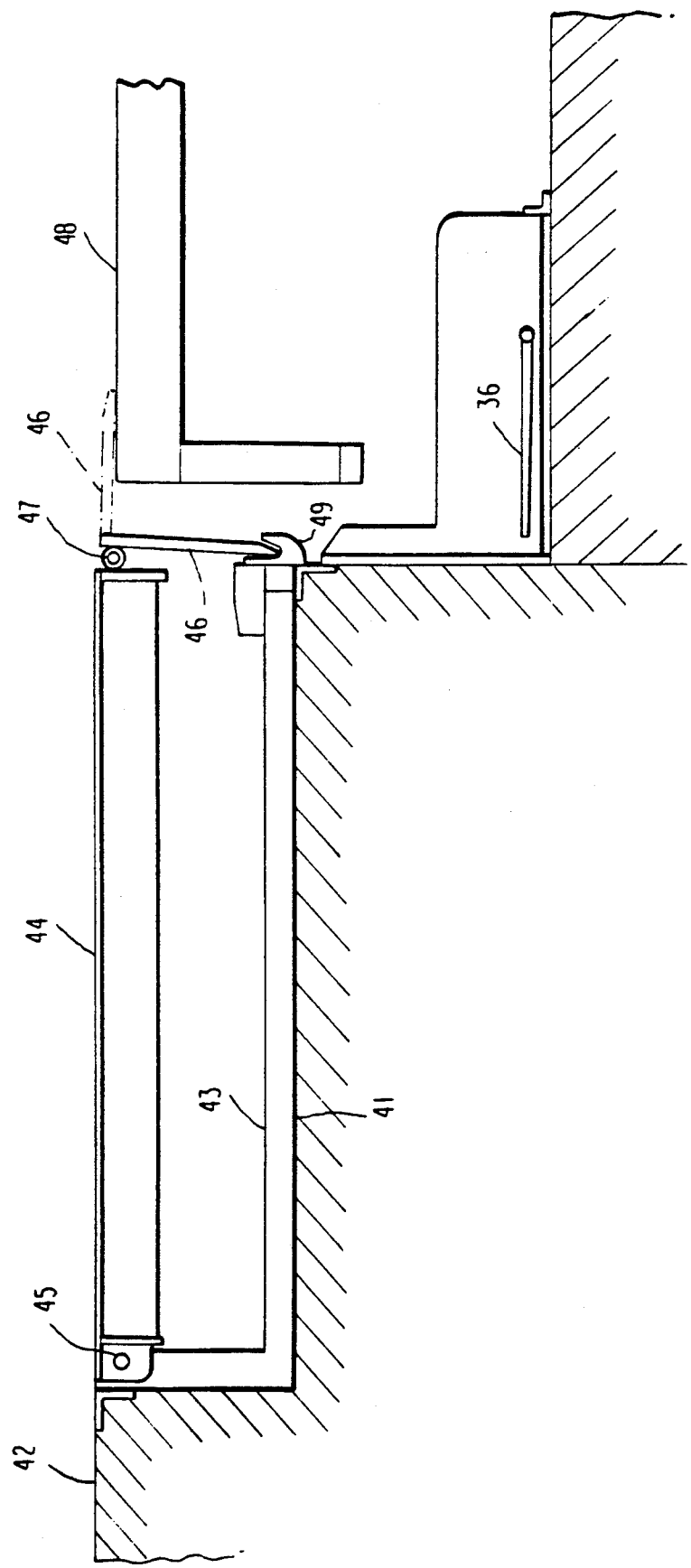
FIG. 3 shows a side view of a typical horizontal pit leveler, employing lip keepers for storing a lip of the leveler.

FIG. 3 shows a typical implementation of a horizontal dock leveler. A lip keeper 49 stores the lip 46 of a horizontally stored dock leveler deck assembly 44. The lip keeper is fixed to a frame 43 of the dock leveler assembly 44. The leveler is placed in a recessed pit 41 formed in the floor 42 of the loading dock. The dock leveler frame 43 is installed in the pit, and the deck assembly 44 pivots about pins 45. The lip 46 pivots about a pin 47. The lip 46 can be extended to rest on the bed of the truck 48 so that the leveler can act as a bridge from the floor 42 to the truck. When the leveler is not in use, the lip 46 is folded down and rests in lip keepers 49 to hold the dock assembly 44 level with the dock floor 42.

Figure 4:
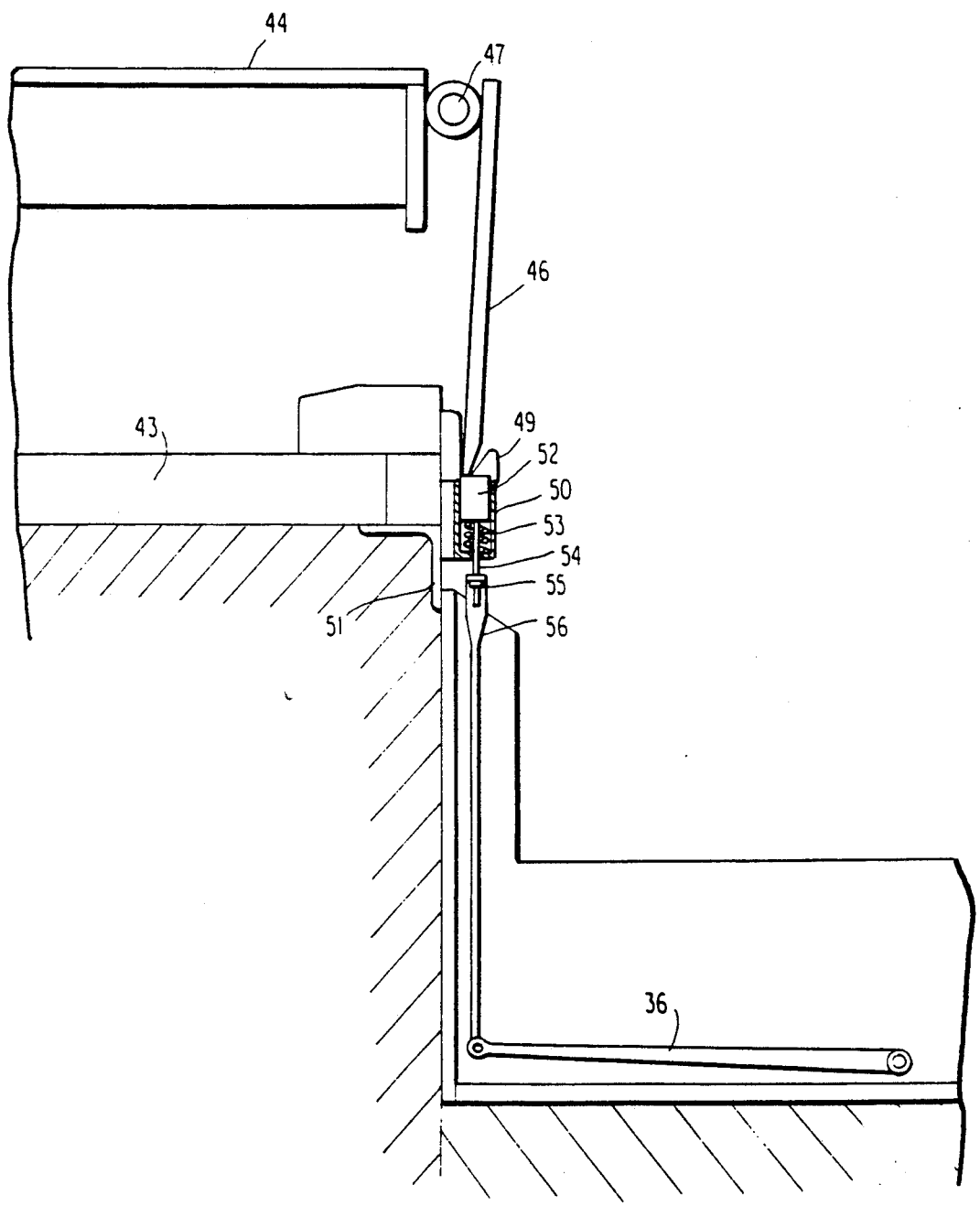
FIG. 4 shows an implementation of the latch release mechanism in association with a lip keeper as shown in FIG. 3.

FIG. 4 shows one implementation of the inventive vehicle restraint actuator in conjunction with the lip keeper structure of FIG. 3. In FIG. 4, a plunger assembly is biased upwardly, against the weight of the dock assembly 44, as imposed by the folded down lip 46. The dock assembly 44, through the lip 46, holds down this plunger assembly when the dock leveler is stored. When the lip 46 is not held in lip keepers 49, the upward force on the plunger assembly pulls up the distal end of the release arm 36, causing the latch arm assembly 31 to disengage from the pin 33 (FIG. 1), thus releasing the vehicle restraint mechanism and allowing it to travel upwardly to engage the ICC bar of a truck.

Looking more closely at FIG. 4, a housing 50 is fixed to the front of the leveler frame 43, as are the lip keepers 49, or to the front pit curb angle bracket 51. A plunger 52 slides within the housing 50, and traps a spring 53 which tends to bias the plunger 52 upwardly. A shaft 54 is attached to the bottom of the plunger 52, and extends through a hole in the bottom of the housing 50, where it is attached by a nut 55 to a link rod 56. The link rod 56 is attached to the distal end of the release arm 36.

The nut 55 is adjustable, in accordance with a length of a thread at the distal end of the shaft 54, so that the height or effective length of the link rod may be adjusted for various dock heights and lip lengths.

When the lip 46 is resting in the lip keepers 49, the plunger 52 is forced down, thus compressing the spring 53. When the dock leveler is actuated, the lip 46 is raised up from the lip keepers 49, and the upward force of the spring 53 forces up the plunger 52. The rising of the plunger 52 pulls the link member 56, and raises the latch release arm 36, thus releasing the latch arm assembly 31. As a result, the actuation of the dock leveler causes the vehicle restraint to engage the truck.

The foregoing sequence of operation is highly advantageous, because if all of the equipment is used in its proper sequence, the dock leveler will not be actuated until the vehicle is properly parked. Further, the vehicle restraint will engage the ICC bar of the truck before the dock leveler is lowered onto the truck. Thus, assuming the operator waits for the truck to be parked properly before actuating the dock leveler, all elements of the just-described structure will function in the correct order.

At the end of a loading or unloading operation, the dock leveler must be re-stored with the lip 46 in the lip keepers 49. The vehicle restraint cannot be released until the dock leveler first has been restored, with the lip in the lip keepers. Once this has been done, the release arm 36 will be free to return to the position which moves the hook part of the latch arm assembly 31 to the left in FIG. 1.

As the vehicle restraint is returned to its stored position, using any of the techniques described in copending application No. 07/466,799, the latch bar 31 will contact the slanted portion of latch arm assembly 31, causing the hook part of the latch arm assembly 31 to move to the right. Once the latch arm assembly 31 has moved sufficiently far to the right, the latch bar 33 will come under the hook part, which then will move back to the left under the biasing force of the spring 39, securing the vehicle restraint.

It should be noted that the combination of link rod 56 and nut 55 allows some free play of release arm 36 during the re-storing operation, so that the link rod 56 can slide upwardly without disturbing the plunger assembly.

Figure 5:
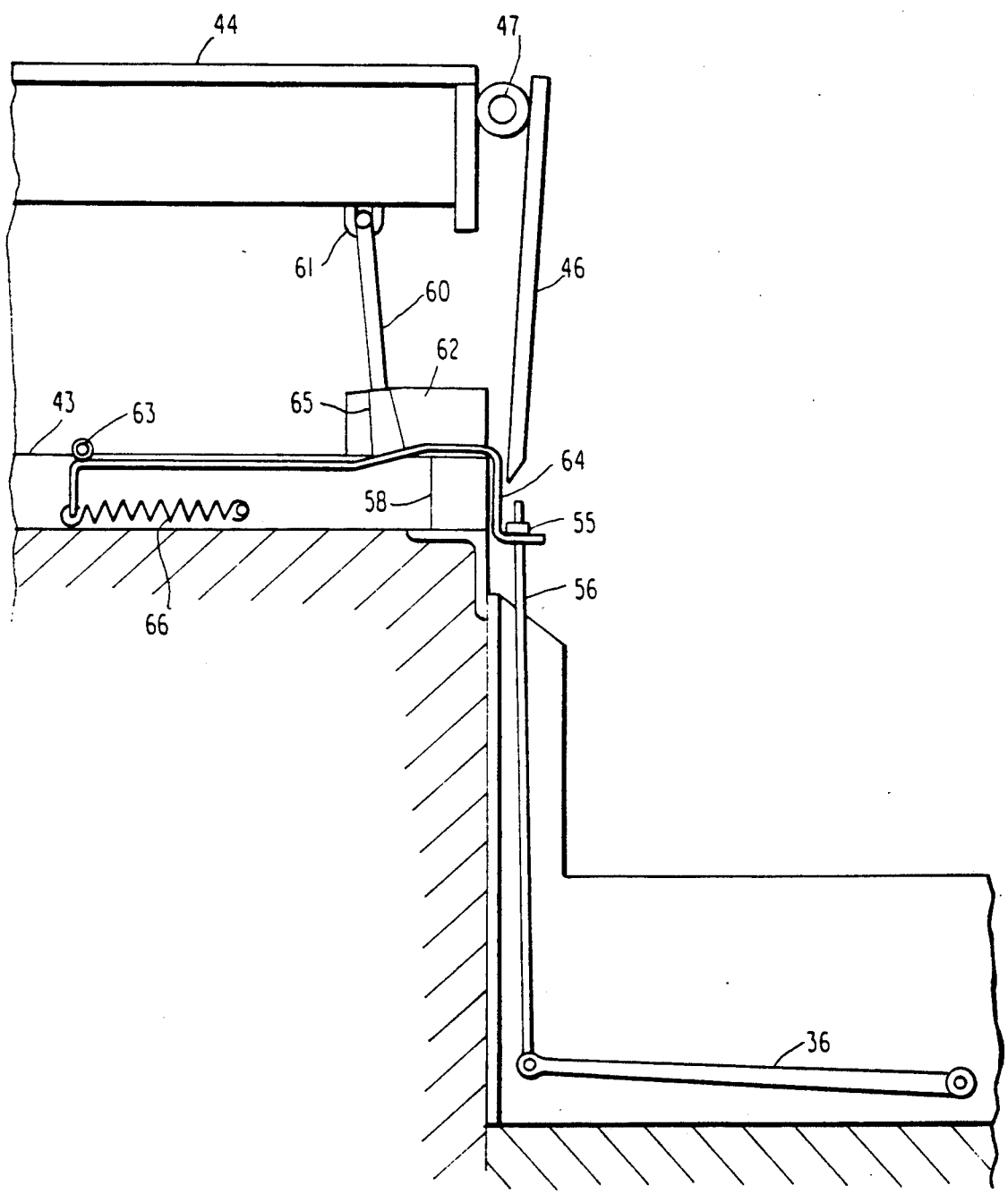
FIG. 5 shows a schematic of another preferred embodiment of the invention.

Some dock levelers do not have lip keepers, but rather use safety legs or cross-traffic legs to hold the dock leveler in the stored position. Because the lip 46 does not rest in lip keepers as in FIG. 4, it is free to swing out, and so cannot be relied upon to actuate the vehicle restraint actuator mechanism. FIG. 5 shows such a dock leveler, with a cross-traffic leg assembly 60.

The leg assembly 60 pivots in a bearing bracket 61, which is attached to the underside of the deck assembly 44. The leg assembly 60 rests on a stop block 62, which is part of the dock leveler frame assembly 43. A shaft 63 is welded to the frame assembly 43 of the dock leveler. An arm assembly 64 is contoured to fit over the front frame member 58, and pivots on the shaft 63.

A bar 65 is attached to the arm assembly 64, so that the bar 65 contacts the bottom of the cross-traffic leg 60. A spring 66 is attached to the rear end of the arm assembly 64, and to the frame 43 of the dock leveler. The top of the link rod 56 is attached to the front of the arm assembly 64 by a nut 55, which allows the effective length of the link rod to be adjusted for various dock height and lip lengths, as in the previously-described embodiment. Of course, the bottom of the link rod is attached to the latch release arm 36, as described previously.

With the foregoing structure, the arm assembly 64 is restrained by the cross-traffic leg 60 resting on the bar 65 when the dock leveler is in its stored position. When the leveler is raised, the spring 66 causes the arm assembly to rotate, raising the latch release arm 36, and allowing the vehicle restraint to engage the truck. Once vehicle loading/unloading is complete, and the dock leveler has been re-stored, the vehicle restraint can be disengaged, again using any of the techniques disclosed in the above-referenced copending application, as described above with reference to FIGS. 1 and 4.

It will be apparent to those of working skill in this technological field that many different configurations of the mechanism described above can be constructed within the scope and spirit of the invention. All such configurations would require some part of the leveler or vehicle loading device to control the motion of a release mechanism so that the vehicle restraint is released when the dock leveler is raised. Accordingly, the invention should be considered as limited only by the scope of the appended claims.

What is claimed is:

1. In a vehicle loading/unloading system comprising a vehicle restraint for maintaining a vehicle substantially stationary while parked at a loading dock when said vehicle restraint is in said operative position, and a dock leveler for providing a smooth surface transition from a floor of a loading dock to a bed of a vehicle, a vehicle restraint actuator comprising:

means for restraining said vehicle restraint so that said vehicle restraint is held in a stored position; and biasing and lifting means, connected to said dock leveler, and responsive to actuation of said dock leveler, for releasing said restraining means, and biasing and automatically lifting said vehicle restraint from said stored position to an operative position to engage said vehicle, wherein said restraining means comprises:

a latch arm;

biasing means for normally biasing said latch arm toward a first position; and a release arm connected to a proximal end of said latch arm;

said biasing and lifting means comprising means for providing force to said release arm in a direction against said biasing means in response to said actuation of said dock leveler, to cause said latch arm to move in a second, opposite direction to release said restraining means, wherein said dock leveler has an extendable lip at one end thereof, said lip resting on said bed of said vehicle when said lip is extended, said vehicle restraint actuator further comprising:

a plunger;

means for biasing said plunger for movement in an upward direction, said lip pressing against said plunger when said dock leveler is in a stored position; and a link rod connected to said plunger, and to a distal end of said release arm, such that, when said dock leveler is actuated, said lip is pulled upwardly from said plunger, causing said plunger to rise and thus pull said release arm, pulling against said biasing means and causing said latch arm to move in said second direction to release said vehicle restraint.

2. A vehicle restraint actuator as claimed in claim 1, further comprising a latch bar connected to said vehicle restraint and a nut for connecting said link rod to said distal end of said release arm, and wherein said latch arm has a hook-shaped portion at a distal end thereof, said hook-shaped portion engaging said latch bar when said vehicle restraint is in said stored position.

3. A vehicle restraint actuator as claimed in claim 2, said hook-shaped portion including a slanted portion on an upper surface thereof, said latch bar sliding relative to said slanted portion as said vehicle restraint returns to said stored position.

4. In a vehicle loading/unloading system comprising a vehicle restraint for maintaining a vehicle substantially stationary while parked at a loading dock when said vehicle restraint is in said operative position, and a dock leveler for providing a smooth surface transition from a floor of a loading dock to a bed of a vehicle, a vehicle restraint actuator comprising:

means for restraining said vehicle restraint so that said vehicle restraint is held in a stored position; and biasing and lifting means, connected to said dock leveler, and responsive to actuation of said dock leveler, for releasing said restraining means, and biasing and automatically lifting said vehicle restraint from said stored position to an operative position to engage said vehicle, wherein said restraining means comprises:

a latch arm;

biasing means for normally biasing said latch arm toward a first position; and a release arm connected to a proximal end of said latch arm;

said biasing and lifting means comprising means for providing force to said release arm in a direction against said biasing means in response to said actuation of said dock leveler, to cause said latch arm to move in a second, opposite direction to release said restraining means, wherein said dock leveler has a cross-traffic leg assembly, said vehicle restraint actuator further comprising:

a stop block positioned below said cross-traffic leg assembly;

an arm assembly pivotable about a shaft attached to said dock leveler assembly; and means for normally biasing said arm assembly in a first direction, wherein movement of said arm assembly in said first direction causes said distal end of said release arm to move upwardly, releasing said latch arm.

5. A vehicle restraint actuator as claimed in claim 4, further comprising a latch bar connected to said vehicle restraint and a nut for connecting said link rod to said distal end of said release arm, and wherein said latch arm has a hook-shaped portion at a distal end thereof, said hook-shaped portion engaging said latch bar when said vehicle restraint is in said stored position.

6. A vehicle restraint actuator as claimed in claim 5, said hook-shaped portion including a slanted portion on an upper surface thereof, said latch bar sliding relative to said slanted portion as said vehicle restraint returns to said stored position.

* * * * *